United States Patent
Buyuktosunoglu et al.

(10) Patent No.: US 11,074,155 B2
(45) Date of Patent: Jul. 27, 2021

(54) GENERATING REPRESENTATIVE MICROBENCHMARKS

(71) Applicant: INTERNATIONAL BUSINESS MACHINES CORPORATION, Armonk, NY (US)

(72) Inventors: Alper Buyuktosunoglu, White Plains, NY (US); Ramon Bertran Monfort, New York, NY (US); Calvin Bulla, Barcelona (ES); Pradip Bose, Yorktown Heights, NY (US); Hubertus Franke, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/375,751

(22) Filed: Apr. 4, 2019

(65) Prior Publication Data
US 2020/0319994 A1  Oct. 8, 2020

(51) Int. Cl.
*G06F 11/36* (2006.01)

(52) U.S. Cl.
CPC ................ *G06F 11/3636* (2013.01)

(58) Field of Classification Search
CPC .................................................. G06F 11/3636
USPC ........................................................ 717/128
See application file for complete search history.

(56) References Cited

U.S. PATENT DOCUMENTS

| | | | |
|---|---|---|---|
| 6,059,835 A | 5/2000 | Bose | |
| 7,143,394 B1* | 11/2006 | Shadmon | G06F 11/3612 717/130 |
| 7,207,035 B2* | 4/2007 | Kobrosly | G06F 8/41 703/22 |
| 7,249,288 B2* | 7/2007 | Peled | G06F 11/348 712/227 |
| 7,739,669 B2* | 6/2010 | Swoboda | G06F 11/3636 714/45 |
| 8,352,907 B2* | 1/2013 | Kettley | G06F 11/366 717/106 |
| 9,215,151 B1 | 12/2015 | Rosa et al. | |
| 9,477,461 B1* | 10/2016 | Korotaev | G06F 16/2228 |
| 10,331,545 B2* | 6/2019 | Smith | G06F 11/36 |
| 10,503,623 B2* | 12/2019 | Keller | G06F 9/45558 |
| 2003/0101436 A1* | 5/2003 | Kobrosly | G06F 8/41 717/128 |

(Continued)

OTHER PUBLICATIONS

Malony et al, "Tracing Application Program Execution on the Cray X-MP and Cray 2", [Online], 1990, pp. 60-73, [Retrieved from internet on Mar. 16, 2021], <https://dl.acm.org/doi/pdf/10.5555/110382.110398> (Year: 1990).*

(Continued)

*Primary Examiner* — S. Sough
*Assistant Examiner* — Zengpu Wei
(74) *Attorney, Agent, or Firm* — Griffiths & Seaton PLLC

(57) ABSTRACT

Embodiments for generating representative microbenchmarks in a computing environment are provided. One or more tracing points may be selected in a target application. Executed instructions and used data of the target application may be dynamically traced according to the one or more tracing points according to a tracing plan. Tracing information of the dynamic tracing may be replicated in an actual computing environment and a simulated computing environment.

20 Claims, 11 Drawing Sheets

(56) References Cited

U.S. PATENT DOCUMENTS

| | | | | |
|---|---|---|---|---|
| 2006/0069952 | A1* | 3/2006 | Peled | G06F 11/348 |
| | | | | 714/25 |
| 2006/0255981 | A1* | 11/2006 | Swoboda | G06F 11/3636 |
| | | | | 341/51 |
| 2010/0115494 | A1* | 5/2010 | Gorton, Jr. | G06F 11/3466 |
| | | | | 717/128 |
| 2011/0035724 | A1* | 2/2011 | Kettley | G06F 8/75 |
| | | | | 717/106 |
| 2011/0119044 | A1 | 5/2011 | Walker | |
| 2012/0304172 | A1 | 11/2012 | Greifeneder et al. | |
| 2014/0331092 | A1 | 11/2014 | Taylor et al. | |
| 2015/0095879 | A1 | 4/2015 | Young | |
| 2016/0140025 | A1 | 5/2016 | Enright et al. | |
| 2016/0140031 | A1* | 5/2016 | Sun | G06F 11/3636 |
| | | | | 717/128 |
| 2016/0283340 | A1 | 9/2016 | Susarla et al. | |
| 2016/0335172 | A1* | 11/2016 | Smith | G06F 11/36 |
| 2017/0315795 | A1* | 11/2017 | Keller | G06F 11/3409 |
| 2018/0150383 | A1 | 5/2018 | Alaranta et al. | |
| 2018/0211046 | A1* | 7/2018 | Muttik | G06F 21/566 |
| 2018/0365127 | A1* | 12/2018 | Gliwa | G06F 11/3636 |
| 2019/0332519 | A1* | 10/2019 | Myers | G06F 11/3093 |

OTHER PUBLICATIONS

Hassan et al, "Tracing Software Architecture Change Using Graph Formalisms in Distributed Systems", [online], 2008, pp. 1-6, [Retrieved from internet on Mar. 16, 2021], <https://ieeexplore.IEEE.org/stamp/stamp.jsp?tp=&arnumber=4530365> (Year: 2008).*

Busse et al, "Simulation-Based Tracing and Profiling for System Software Development", [Online], 2017, pp. 1-6, [Retrieved from internet on Mar. 16, 2021], <https://dl.acm.org/doi/pdf/10.1145/3078468.3078475> (Year: 2017).*

"Comparing different approaches for Incremental Checkpointing: The Showdown" Manav Vasavada et al. https://www.kernel.org/doc/ols/2011/ols2011-vasavada.pdf (12 Pages).

K. Vaswani, M. J. Thazhuthaveetil, and Y. N. Srikant, "A programmable hardware path profiler," in Proceedings of the International Symposium on Code Generation and Optimization, ser. CGO '05, 2005.

A. Shye, M. Iyer, T. Moseley, D. Hodgdon, D. Fay, V. J. Reddi, and D. A. Connors, "Analysis of path profiling information generated with performance monitoring hardware," in Proceedings of the 9th Annual Workshop on Interaction Between Compilers and Computer Architectures, ser. INTERACT '05, 2005, pp. 34-43.

H. Chen, W.-C. Hsu, J. Lu, P.-C. Yew, and D.-Y. Chen, "Dynamic trace selection using performance monitoring hardware sampling," in Proceedings of the International Symposium on Code Generation and Optimization: Feedback-directed and Runtime Optimization, ser. CGO'03, 2003 (12 Pages).

R. Levin, I. Newman, and G. Haber, "Complementing missing and inaccurate profiling using a minimum cost circulation algorithm," in Proceedings of the 6th International Conference on High Performance and Embedded Architectures and Compilers. Springer Berlin Heidelberg, 2008, pp. 291-304.

M. Bond and K. McKinley, "Continuous path and edge profiling," in Proceedings of the 38th Annual IEEE/ACM International Symposium on Microarchitecture, ser. MICRO 38, 2005, pp. 130-140.

M. D. Bond and K. S. McKinley, "Practical path profiling for dynamic optimizers," in Proceedings of the International Symposium on Code Generation and Optimization, ser. CGO '05, 2005, pp. 205-216.

R. Joshi, M. D. Bond, and C. Zilles, "Targeted path profiling: Lower overhead path profiling for staged dynamic optimization systems," in Proceedings of the International Symposium on Code Generation and Optimization: Feedback-directed and Runtime Optimization, ser. CGO'04, 2004, pp. 239.

R. H. Bell, Jr. and L. K. John, "Improved automatic testcase synthesis for performance model validation," in Proceedings of the 19th annual international conference on Supercomputing, ser. ICS '05, 2005, pp. 111-120.

* cited by examiner

US 11,074,155 B2

GENERATING REPRESENTATIVE MICROBENCHMARKS

GOVERNMENT LICENSE RIGHTS TO CONTRACTOR-OWNED INVENTIONS MADE UNDER FEDERALLY SPONSORED RESEARCH AND DEVELOPMENT

This Invention was made with Government support under Contract No.: HR-0011-18-C-0122 awarded by Defense Advanced Research Projects Agency (DARPA). The Government has certain rights in this invention.

BACKGROUND OF THE INVENTION

Field of the Invention

The present invention relates in general to computing systems, and more particularly to, various embodiments for generating representative microbenchmarks using a computing processor.

Description of the Related Art

In today's interconnected and complex society, computers and computer-driven equipment are more commonplace. Processing devices, with the advent and further miniaturization of integrated circuits, have made it possible to be integrated into a wide variety of devices. In recent years, both software and hardware technologies have experienced amazing advancement. With the new technology, more and more functions are added, and greater convenience is provided for use with these computing systems.

SUMMARY OF THE INVENTION

Various embodiments for generating representative microbenchmarks in a computing environment are provided. In one embodiment, by way of example only, a method for generating representative microbenchmarks, by a processor, is provided. Executed instructions and used data of the target application may be dynamically traced according to the one or more tracing points according to a tracing plan. Tracing information of the dynamic tracing may be replicated in an actual computing environment and a simulated computing environment.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
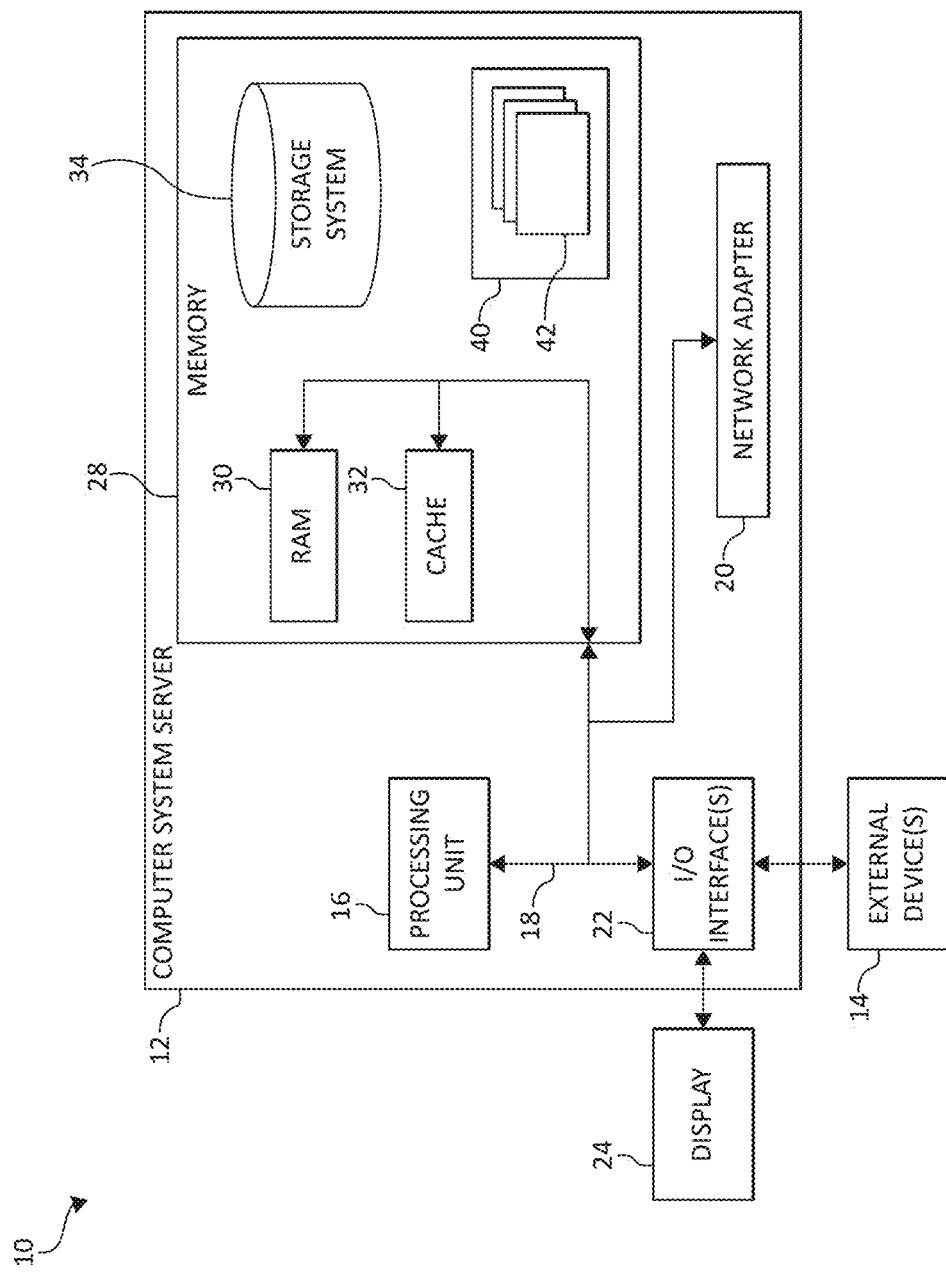
FIG. 1 is a block diagram depicting an exemplary cloud computing node according to an embodiment of the present invention.

As computing systems improve, it becomes imperative to analyse large scale applications. However, such analysis is difficult, time consuming, and only provide course-grained profiling. Currently, there are numerous ways for analysing the performance these computing application but have various challenges. For example, synthetic microbenchmarks and their corresponding methodologies overestimate real application activity and thus are too conservative. Representative microbenchmarks can help to set realistic design points.

Thus, the present invention provides various embodiments to provide a representative microbenchmark that exactly replicates the behavior of regions of interest of a target application. The representative microbenchmark may be chosen to represent a loop with high execution frequency or specific regions of interest, while also being representative requires the capability to reproduce identical program/application code and data state. In one aspect, the present invention provides for tracing memory state at page granularity, which includes the application code and data page, so as to protect memory at the beginning of a microbenchmark, register segmentation faults, and save any data.

In one aspect, executed instructions and used data of the target application may be dynamically traced according to the one or more tracing points according to a tracing plan. Tracing information of the dynamic tracing may be replicated in an actual computing environment and a simulated computing environment.

In an additional aspect, the present invention provides for tracing code (e.g., software/application/program code) and data pages for generating representative microbenchmarks. One or more tracing points may be selected in a target application based on 1) a preliminary profiling pass, 2) temporal sampling, and/or 3) a combination/hybrid operation of the preliminary profiling pass and temporal sampling. In one aspect, the profiling phase may include a) implementing a time-base sampling pass and/or instruction-based sampling pass and/or 2) determining a region of interest (by frequency of execution) such as, for example, a beginning address and an end addresses (e.g., an entry/exit point of a function). A function may be a set of instructions beginning at an entry point and ending at an endpoint. A function may refer to one or more sections of code that are callable in a program.

The tracing operations may include a) dynamic instrumentation that traces individual execution of region of interest, b) temporal sampling that may sample execution and trace during a selected-time window, and/or c) a hybrid operation that may trace during a selected time window, but tie to a region of interest. In one aspect, dynamic instrumentation is an operation that instruments a running application with probes to collect runtime information. It is a flexible operation and does not depend on a priori knowledge on where to instrument or with what probes. That is, dynamic instrumentation of software (e.g., a computer program), may be used to collect data (e.g., performance data) with respect to the software without recompiling or rebuilding the software.

A tracing scheme/plan may be provided to enable dynamic tracing of executed instructions and used data by employing dynamic instrumentation under a ptrace interface to protect select memory regions and detect program/code execution and data accesses at page granularity. A post-process pass may be used to replicate extracted traces in real computing environments and simulated computing environments. Collected traces from the dynamic tracking may be analyzed to eliminate redundancy and prepare the collected traces for standalone execution.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
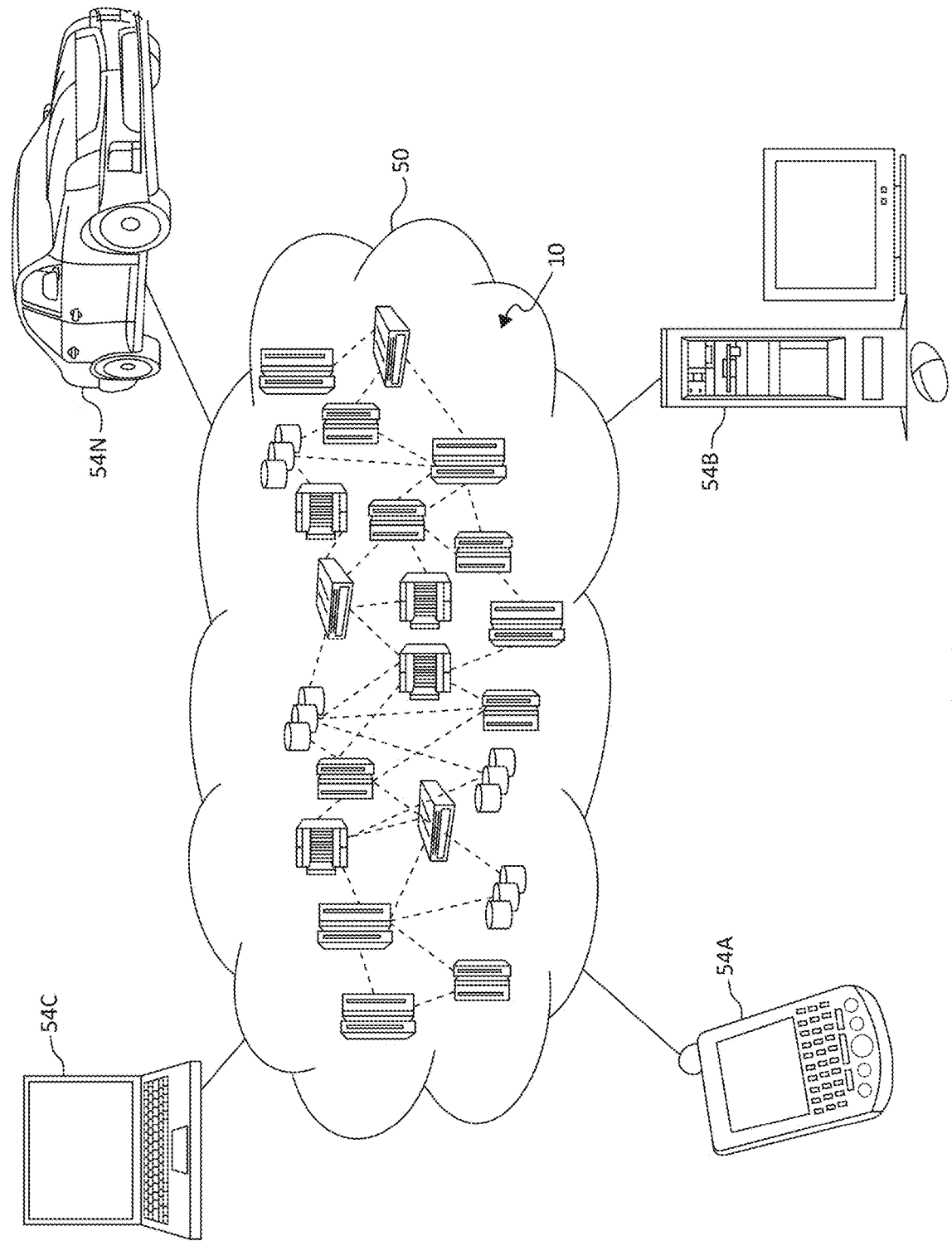
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
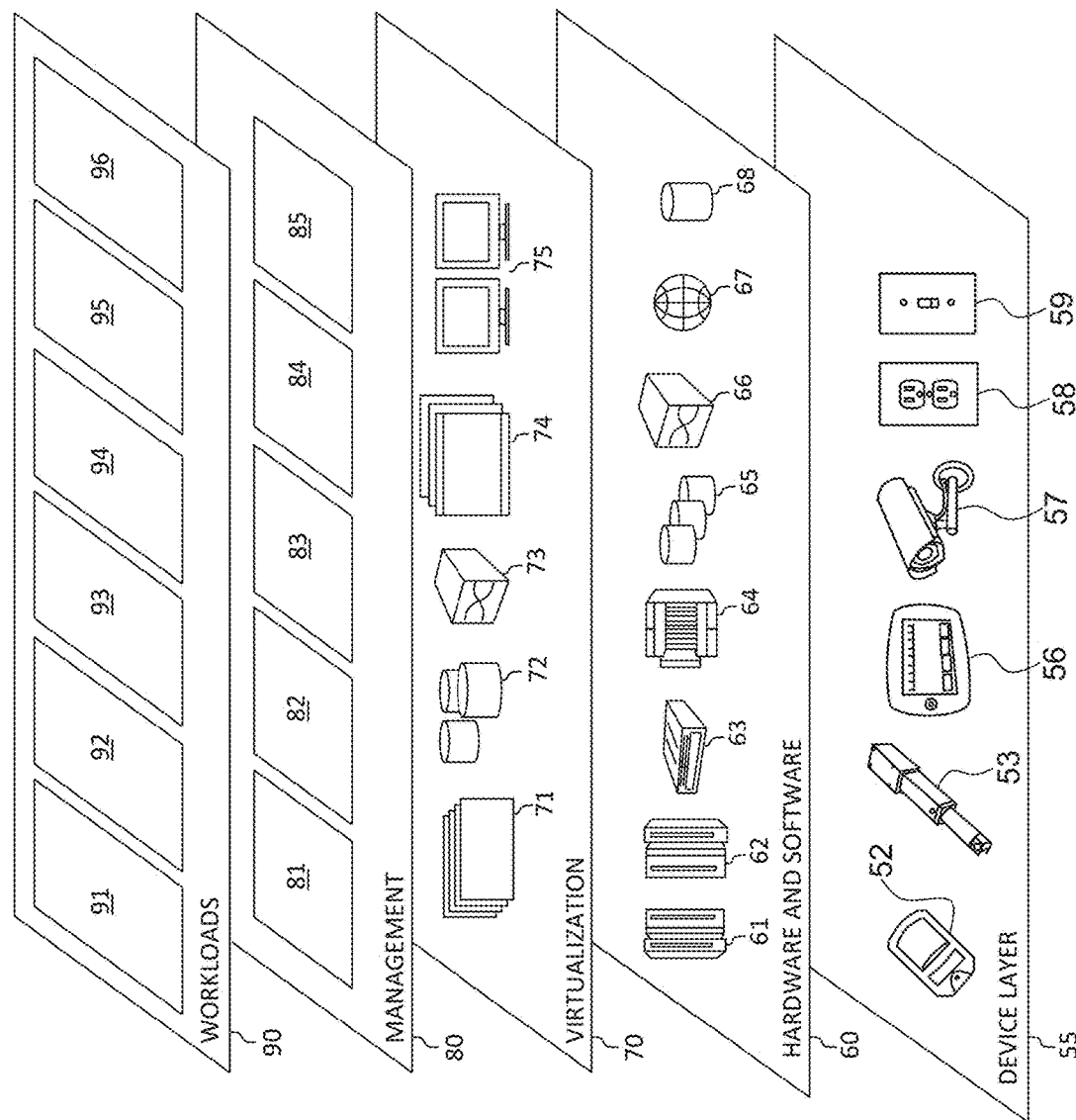
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various generating representative microbenchmarks workloads and functions 96. In addition, generating representative microbenchmarks workloads and functions 96 may include such operations as data analysis (including data collection and processing from various environmental sensors) and predictive data analytics functions. One of ordinary skill in the art will appreciate that the generating representative microbenchmarks workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
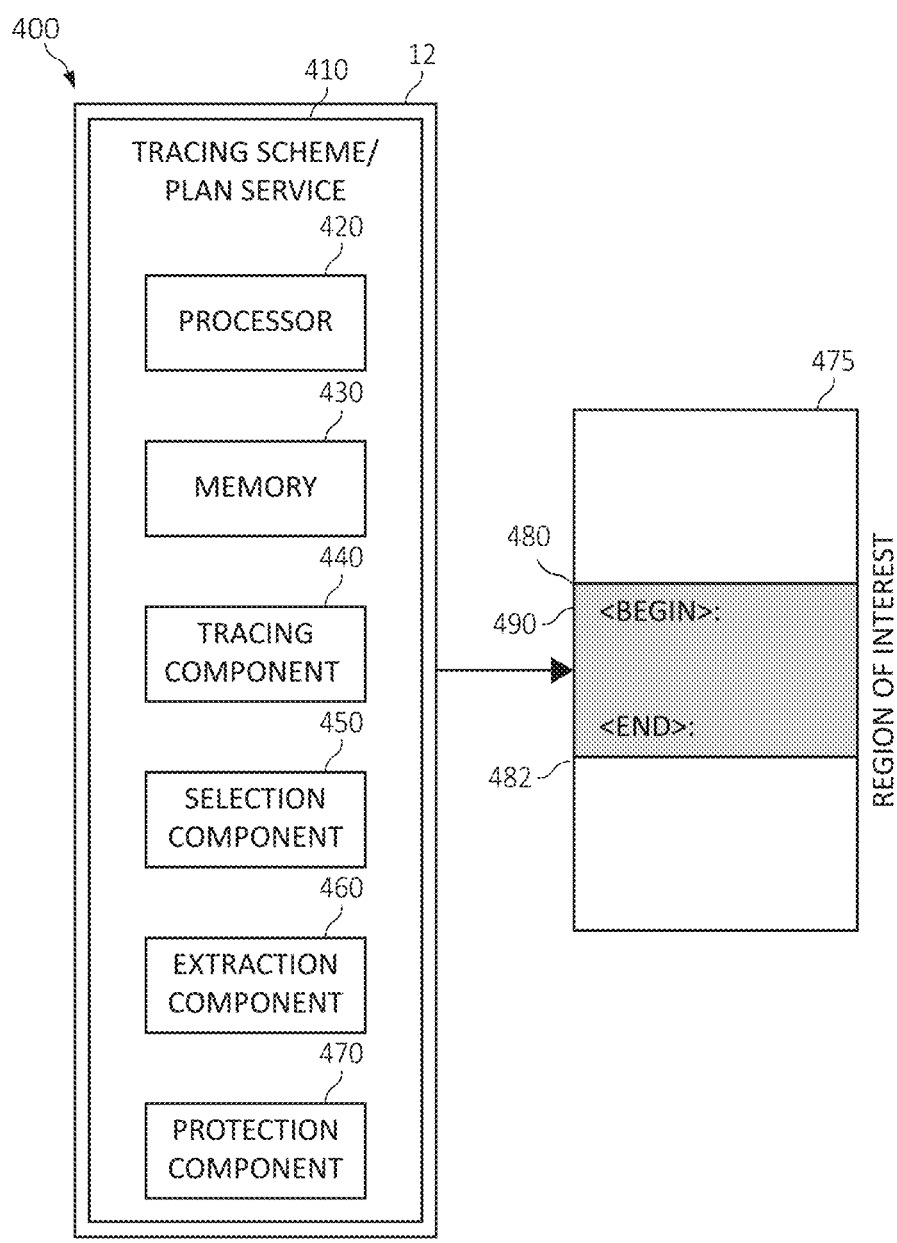
FIG. 4 is an additional block diagram depicting various user computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A tracing scheme/plan service 410 is shown, incorporating processing unit 420 ("processor") to perform various computational, data processing and other functionality in accordance with various aspects of the present invention. In one aspect, the processor 420 and memory 430 may be internal and/or external to the tracing scheme/plan 410, and internal and/or external to the computing system/server 12. The tracing scheme/plan service 410 may be included in computer system/server 12, as described in FIG. 1. The processing unit 420 may be in communication with the memory 430. The tracing scheme/plan service 410 may include a tracing component 440, a selection component 450, an extraction component 460, and a protection component 470.

As one of ordinary skill in the art will appreciate, the depiction of the various functional units in tracing scheme/plan service 410 is for purposes of illustration, as the functional units may be located within the tracing scheme/plan service 410 or elsewhere within and/or between distributed computing components.

In one aspect using the tracing scheme/plan service 410, the tracing component 440 may define the tracing scheme/plan to include using dynamic instrumentation to protect one or more memory regions and detect code execution and data accesses at a page granularity. The tracing component 440 may define the tracing scheme/plan for the dynamic tracing by defining the one or more tracing points and extracting one or more accessed pages by dynamically instrumenting the target application. The tracing component 440 may define the tracing scheme/plan for the dynamic tracing by using a process trace interface to control a pace of the dynamic tracing and protect a selected memory within a defined region of interest in the target application. The tracing component 440 may define the tracing scheme/plan to include a profiler and a traced process and define the tracing plan to include a preamble, region of interest, and an epilogue.

Additionally, the selection component 450 may define one or more tracing points such as, for example, trace markers 480 and 482. For example, dynamic instrumentation may be used to select/define the trace markers 480 and 482 (e.g., breakpoints at begin/end addresses). In an alternative embodiment, the selection component 450 may select/define the trace markers 480 and 482 using temporal sampling that is time-based interrupts.

The extraction component 460 may extract accessed data pages by dynamically instrumenting a target application 475 (e.g., static application/program code). The tracing component 440 may use a process trace operation (e.g., "ptrace interface") to control traced process. The extraction component 460 may extract register information and insert tracing routines (e.g., from a preloaded library).

The protection component 470 may protect memory inside one or more regions of interest such as, for example, region of interest 490. The protection component 470 may remove read permissions, write permissions, and/or execute permissions. The protection component 470 may detect page accesses using segmentation faults.

The tracing component 440 may perform a post processing to replicate the tracing information and analyze collected trace information and eliminate redundancy of the collected trace information. The tracing component 440 may replicate tracing information of the dynamic tracing in an actual computing environment and a simulated computing environment.

Figure 5:
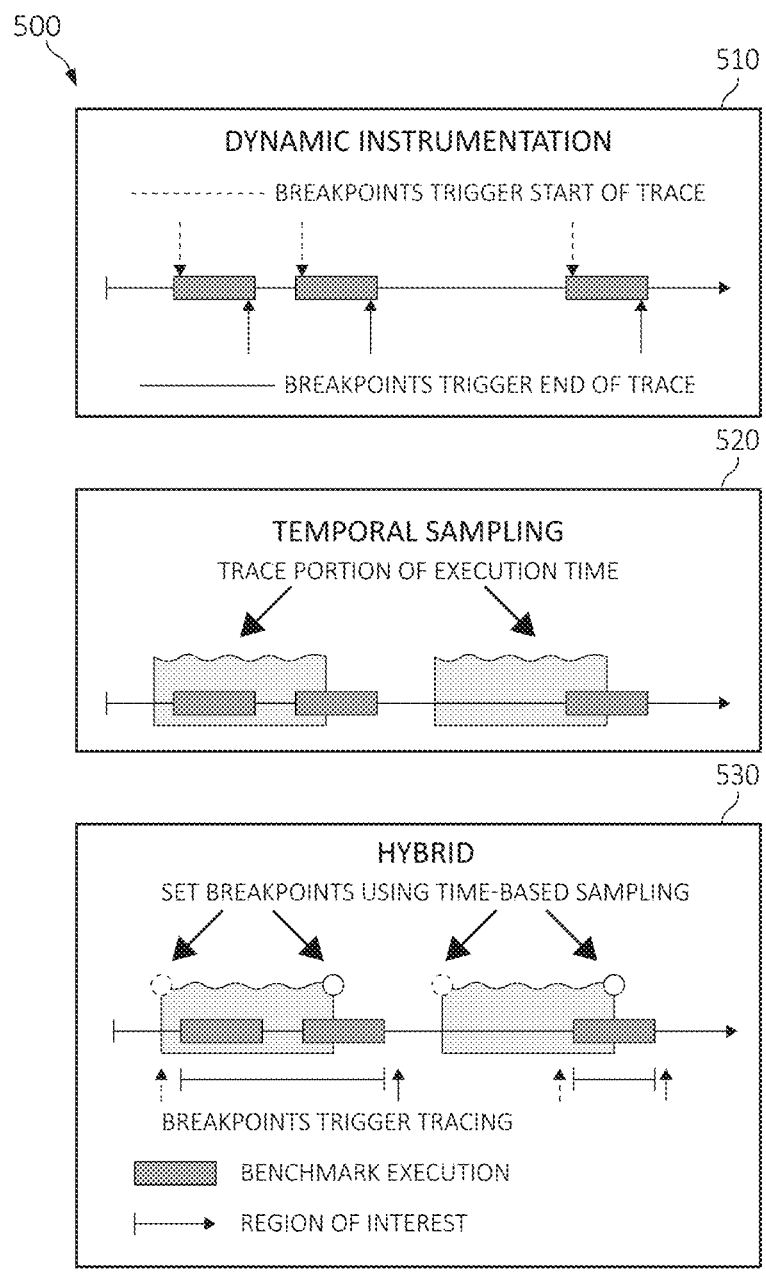
FIG. 5 is a diagram depicting tracing operations in accordance with aspects of the present invention.

In view of the foregoing, consider the following operation examples illustrated in FIG. 5 of the implementation of the aforementioned functionality. Turning now to FIG. 5, a diagram 500 depicting tracing operations is provided. Operations of FIG. 5 may be incorporated into various hardware and software components of a system in accordance with the present invention, such as those described in FIGS. 1-4.

The tracing operations may include a) dynamic instrumentation 510 that traces individual execution of region of interest. One or more trace markers (e.g., breakpoints) may be defined/selected. For example, a breakpoint may be defined/selected that triggers a start of the trace. Another breakpoint may be defined/selected that triggers the end of the trace.

Another tracing operation/methodologies may include temporal sampling 520. The temporal sampling 520 may sample execution and trace during a selected-time window. That is, during the defined/selected temporal sample, a trace operation may be initiated/executed and to trace a selected area (e.g., a traced portion) during a selected time window. In one aspect, a region of interest that is intended to be traced may be within and/or outside the selected time window.

In an additional aspect, an additional tracing operation/methodologies may include a hybrid operation. The hybrid operation 530 may be a combination of the dynamic instrumentation 510 and the temporal sampling 520. The hybrid operation 530 may trace during a selected time window and also be connected/associated/tied to a region of interest. For example, one or more breakpoints may be set using time-based sampling and one or more alternative/additional breakpoints may be set to trigger tracing.

Figure 6A:
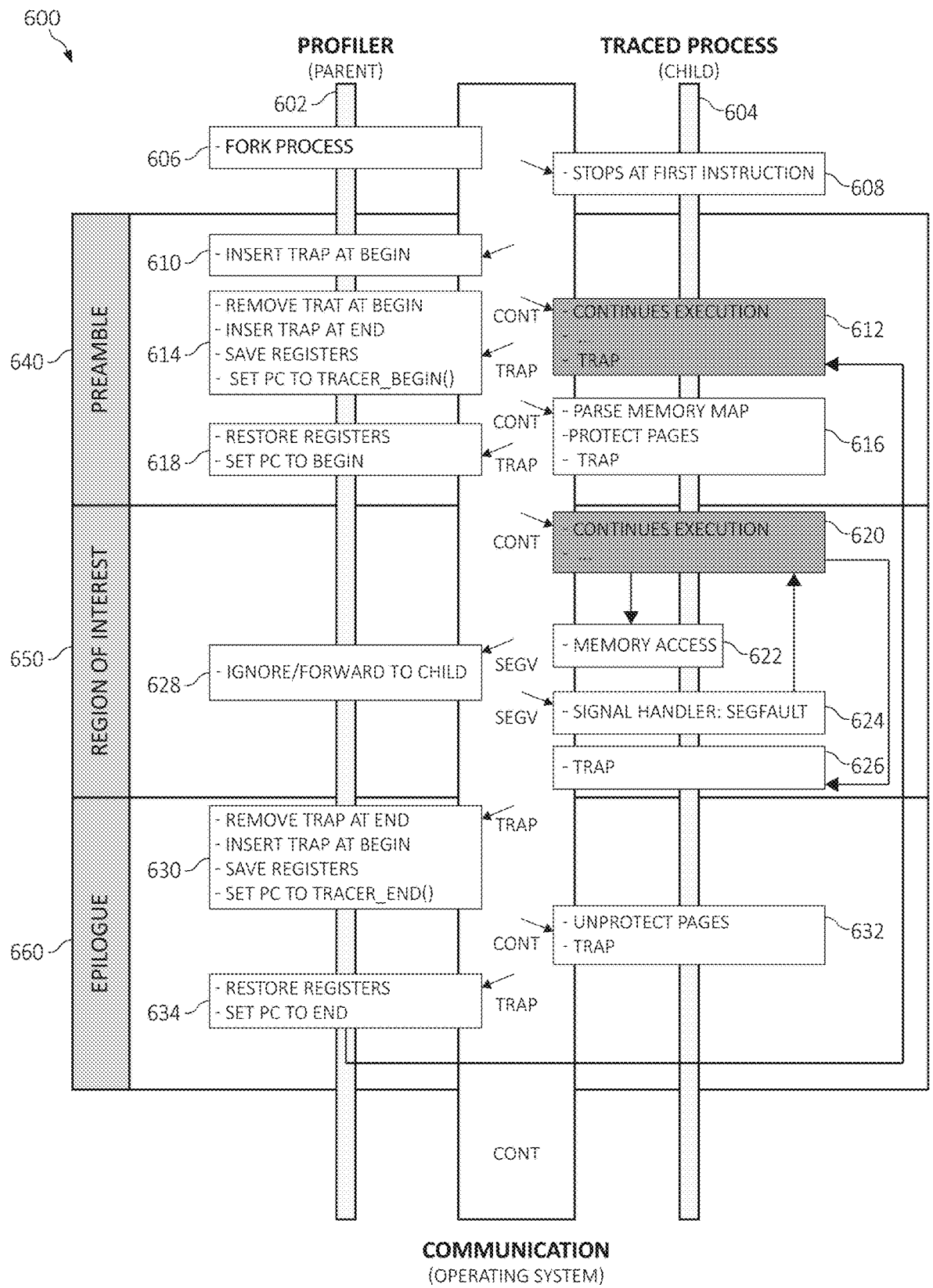
FIG. 6A is a diagram depicting implementation of a tracing scheme/plan in accordance with aspects of the present invention.
Figure 6B:
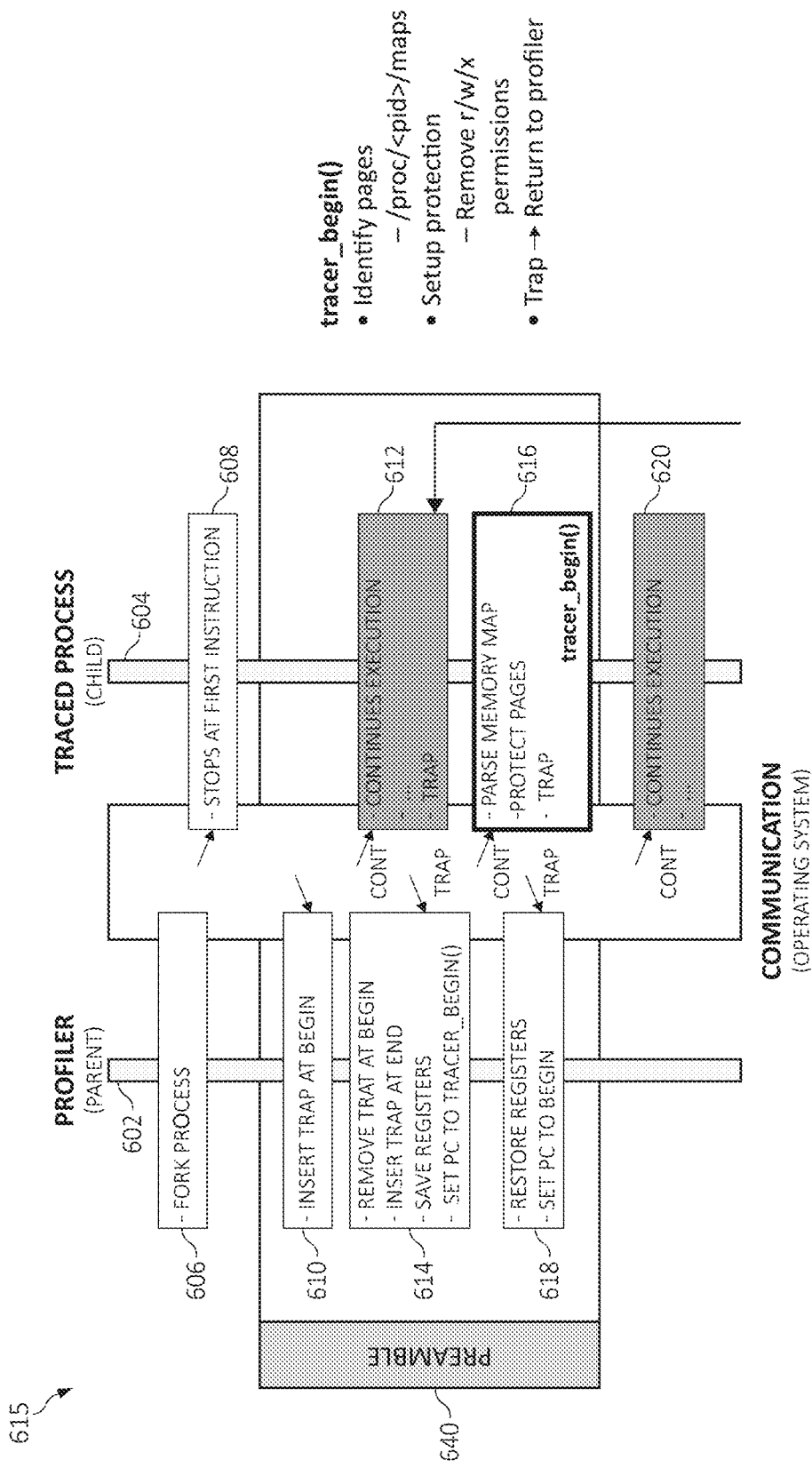
FIG. 6B is a diagram depicting a tracing scheme/plan in a preamble in accordance with aspects of the present invention.
Figure 6C:
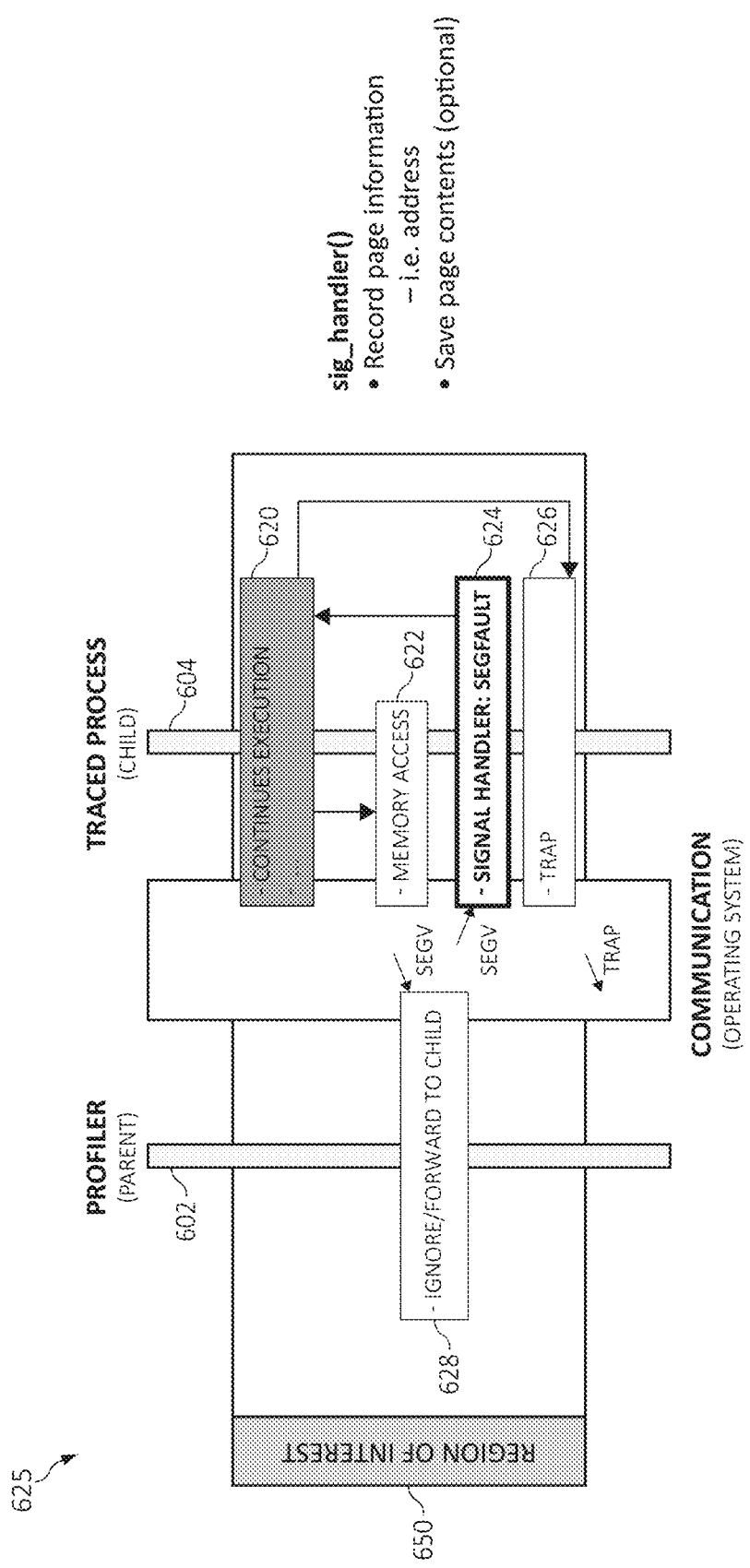
FIG. 6C is a diagram depicting a tracing scheme/plan in a region of interest in accordance with aspects of the present invention.
Figure 6D:
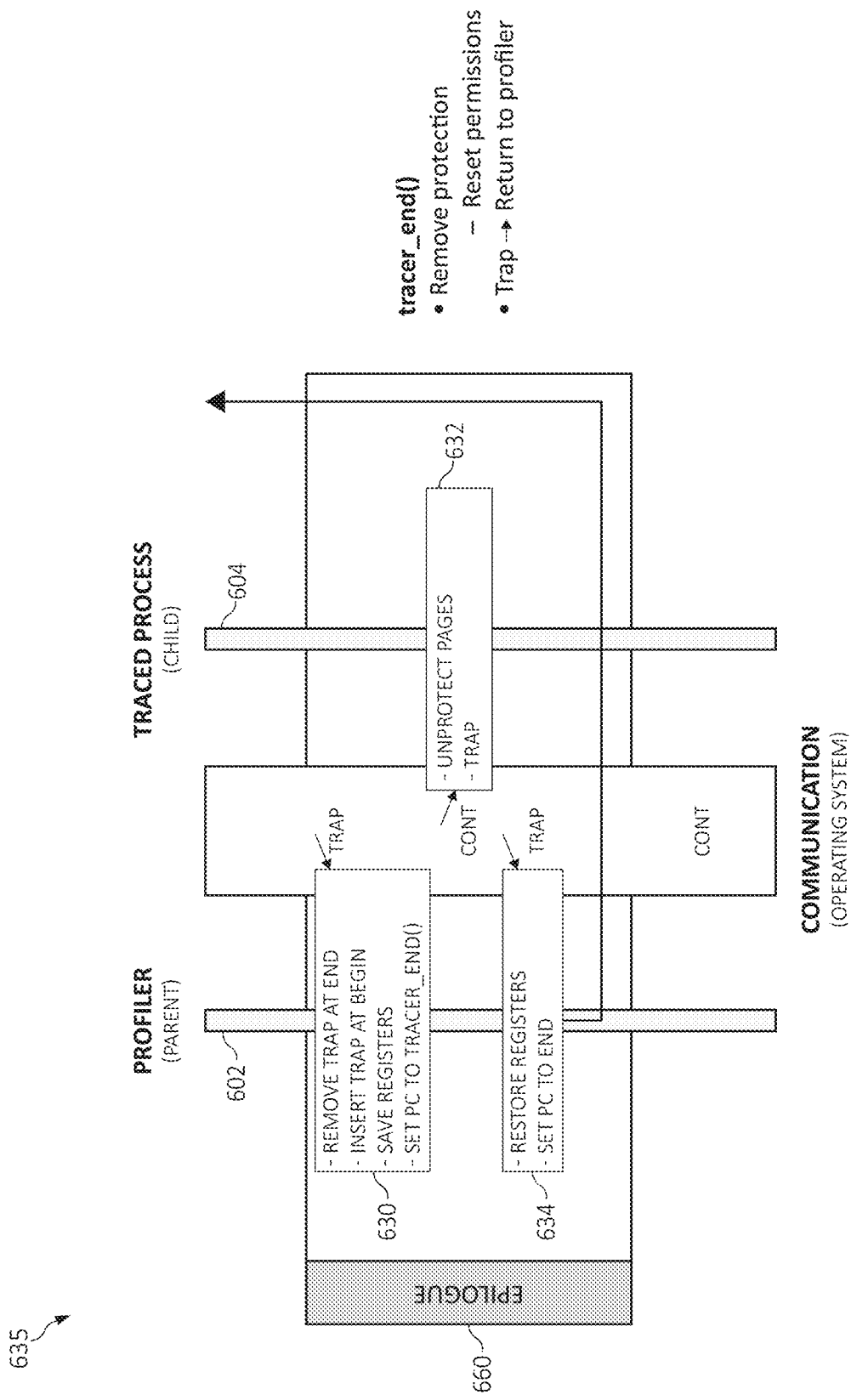
FIG. 6D is a diagram depicting a tracing scheme/plan in an epilogue in accordance with aspects of the present invention.
Figure 6E:
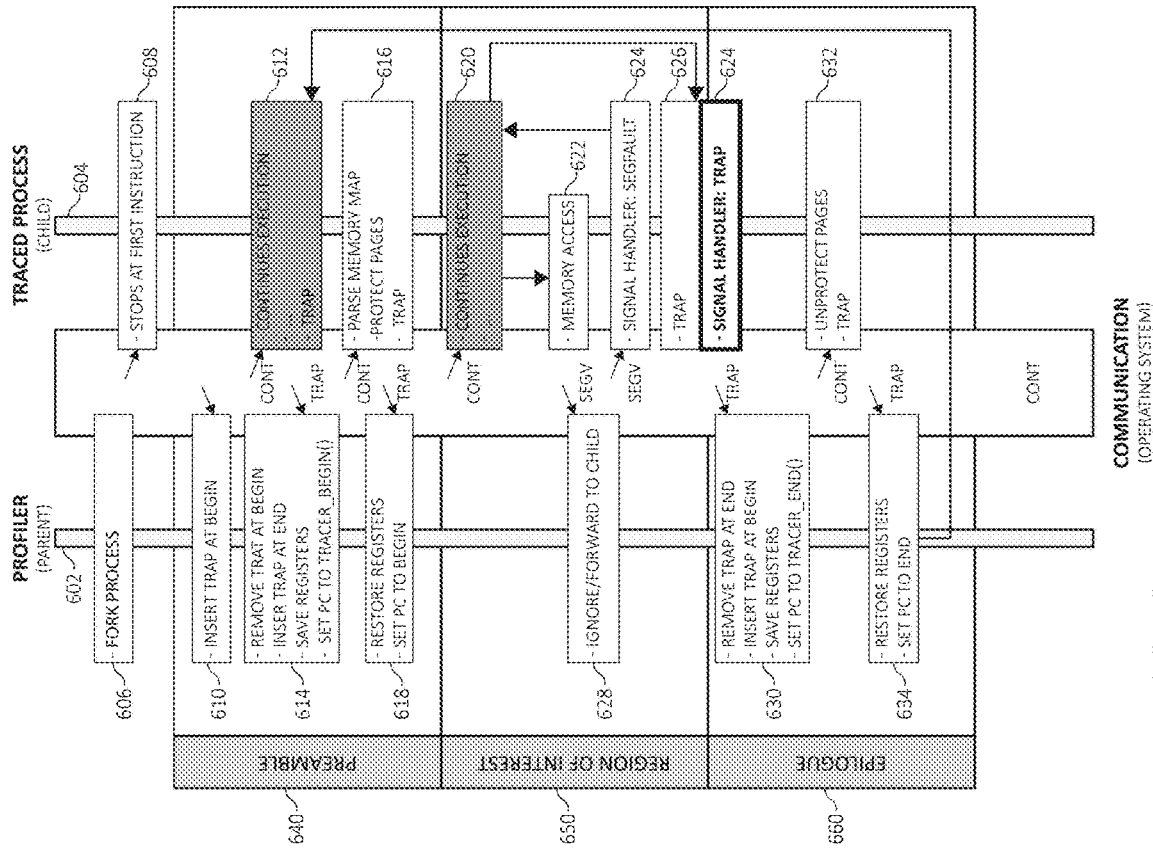
FIG. 6E is a diagram depicting a tracing scheme/plan with reduced overhead in accordance with aspects of the present invention.

Turning now to FIGS. 6A-E, diagrams 600, 615, 625, 635, and 645 implementation of a tracing scheme/plan. More specifically, FIGS. 6B-6E depict various operations illustrated in FIG. 6A for a tracing scheme/plan. That is, diagram 615 depicts a preamble 640, diagram 625 depicts a region of interest 650, and diagram 635 depicts an epilogue 660 each of which are illustrated in diagram 600. Diagram FIG. 6E depicts the tracing scheme/plan illustrated in diagram 600 but using reduced overhead. Operations of FIGS. 6A-E may be incorporated into various hardware and software components of a system in accordance with the present invention, such as those described in FIGS. 1-5.

As illustrated in FIG. 6A, a tracing scheme/plan may include more than one different processes such as, for example, profiler 602 (e.g., a parent or parent process or "profiler component") and a traced process 604 (e.g., a child or child process of the profile 602 process). That is, executing the tracing scheme/plan may use a separate stack (e.g., the traced process 604) to allow for protecting the original stack (e.g., the profiler 602) and trace stack access pattern. Three distinct states may be defined/identified such as, for example, the preamble 640 (e.g., a preamble state/stage), the region of interest 650 (e.g., a region of interest state/stage), and the epilogue 660 (e.g., an epilogue state/stage).

Starting in the preamble 640, as illustrated in FIGS. 6A and 6B, the profiler 602 may create a child process 604. This may be achieved using a fork system call, as in block 606, which creates a copy of the original parent process 602 that then becomes the child process 604. That is, a system call fork may create a new process, which becomes the child 604 process of the profiler 602.

The fork process initiated by the profiler 602 may stop execution after a first instruction on the traced process 604, as in block 608. The child process 604 may stop/pause its execution immediately when/before the first instruction is executed, and control may revert to its parent process 602. (This is achieved using a ptrace interface).

The profiler 602 may insert a trap (e.g., a legal instruction to execute and/or a user defined breakpoint) at tracing point (e.g., a begin trace point or "begin"), as in block 610. That is, the trace markers/trace points have been selected previously and determine the execution section that is desired/intended to trace (i.e., insert trap instructions at the selected points/markers). The traced process 604 may continue execution from the point where it was stopped (first instruction) until it executes the trap instruction that has been previously inserted at the begin trace point (see block 610). At this point, control may revert back to the profiler 602, as in block 612.

The profiler 602 (e.g., parent process 602) may remove the trap at the tracing point (e.g., at a begin trace point or "begin"), one or more registers may be saved, and a program counter ("PC") may be set to tracer_begin (e.g., a tracer_begin( ) function which may be a separate library), as in block 614. At block 616 at the traced process 604, the tracer_begin may parse a memory map, save one or more data pages, and continue the trap. That is, the trap instruction may be executed to forcefully revert control back to the profiling process. That is, the tracer_begin( ) function may be executed and identify the page layout of the child process. This information may be accessible over the file system (e.g., under a Linux® kernel it is mapped to /proc/<pid>/maps). That is, the tracer_begin( ) function may be executed and identify page and protection may be set up by removing read (r), write (w), and execution (x) ("r/w/x") permissions, and return the trap to the profiler 602.

At the profiler 602, one or more registers may be restored and set the PC to begin (e.g., set the begin to the region of interest 650), as in block 618. The execution continues, at block 620 and enters the "region of interest" 650 (state/stage).

In block 622, with the memory protected, the traced process 604 may access memory and a segmentation fault ("segv"). The segmentation faults are created automatically, since the access permissions are removed to the selected memory pages (e.g., the present invention takes advantage on default security features to track memory accesses).

The profiler 602 ignores/forwards a signal back to the traced process 604 (e.g., child process 604), as in block 628. That is, the parent process 602 (e.g., profiler 602) is still actively tracing the child process 604. Under ptrace, this means that any signal (this includes the segmentation fault) will revert control back to the parent process 602. In this instance, a signal handler may be installed in the child process 604 that deals with segmentation faults, which is why the parent process 602 ignores this signal, and forwards it to the child process 604, where it is then handled.

The sig_handler( ) function 624 (e.g., "segfault") may access the protected memory in the region of interest, record data page information (e.g., address), and save/dump data page content. The signal is forwarded back to block 620 and continues execution. The trap continues at the traced process 604, at block 626.

Moving to the epilogue 660 of FIG. 6E, the profiler 602 may remove the trap at the tracing point (e.g., at an end trace point or "end"), insert the trap at the tracing point (e.g., at a begin trace point or "begin"), save one or more registers, set the PC to end (e.g., tracer-end( ) function), as in block 630. The traced process 604 may unprotect the data pages (reset the permissions) and hit the trap and return to the profiler, as in block 632. The profiler 602 may restore the one or more registers and set the PC to end, as in block 634.

It should be noted, as illustrated in FIG. 6D, the tracing scheme/plan may be executed with reduced overhead by removing communication inside of the region of interest 650 and detach/reattach the profiler 602 from the traced process 604.

It should be noted that program codes may call functions from a library such as, for example, a standard C library (e.g., memcpy). Currently, the way these calls are resolved can present a problem since the present invention is not interested in tracing the dynamic address. Thus, the present invention may a) ignore first traces (where dynamic resolution happens), and b) set LD_BIND_NOW to force address resolution at start of execution. A Procedure Linkage Table ("PLT") belongs to the processes address space (e.g., r/w memory) and is automatically protected and extracted. The PLT is used to resolve external symbols whose address is not known while linking (i.e., dynamically linked). That is, meta-information may be used to resolve external symbols (e.g. Procedure Linkage Table, PLT) and may be automatically protected and extracted.

Also, for the present invention may enable tracing indirect calls such as, for example: mcf/spec_qsort. The qsort is a C standard library function that implements a polymorphic sorting algorithm for arrays of arbitrary objects according to a user-provided comparison function. The qsort takes a function as argument and the qsort function is used to compare elements while sorting the array. In assembly this translates to an indirect branch (branch to register) and the challenge is that the target address is statically unknown. Thus, in one aspect, in a practical solution, since the branches to registers are not common, a qsort only ever uses one(!) compare function (e.g., cost_compare) and can be identified statically by observing at the code. As a generic solution, the present invention may: a) instrument a branch, record a target address, and when branching b) protect code pages and extract code that is being executed, and/or c) provide a combination thereof.

For code tracing, the present invention may protect code pages (similar to data pages) and remove an executable flag. In a first instruction, every data page may provoke a segmentation fault and trace the executed code. One or more shared functions between user code and support library may open, close, and/or write. A provided solution includes custom implementation and not protecting shared code pages. The implementation of support routines (e.g., sig_handler, trace_begin, trace_end) may make use of functionality that is also being used by the user code that is being traced. This may provoke faulty behavior (e.g., the shared code pages are protected and subsequently enter one of these support routines) such as, for example, a library's (e.g., c++ libc's) open, close, and write routines, which are used during file I/O in the support routines. The present invention provides two solutions to tackle this problem: (a) provide a custom implementation (this way the code is not shared) or (b) use a conservative approach (i.e., do not protect shared code pages and always extract the shared code pages). Since this problem generally only affects code pages, it would be sufficient to extract them once. The present invention also enables tracking of dynamic calls and indirect branches.

In an additional aspect, for support for different architectures, a tracing scheme/plan may only depend on a selected infrastructure by 1) setting memory access permissions, 2) detecting/treating system calls (e.g., segmentation faults), and 2) modifying/reading memory/register contents. Also, low-level manipulation may be the only architecture-dependent aspect. That is, low-level manipulation is the only architecture-dependent aspect to set the program counter, stack manipulation (depends on stack register), and/or parsing of system calls (which register holds which argument), and/or application binary interface ("ABI") conventions.

Additionally, the present invention may group multiple iterations. The challenge is that one iteration trace is too small to "warm up" a simulator such as, for example, microarchitectural state (e.g., caches). Thus, the present invention may extract multiple consecutive iterations, add a counter when entering region of interest, and do not unprotect/reprotect between consecutive iterations. Larger traces may be allowed to adjust the warmup of the microarchitecture. Also, the required/needed number of iterations may depend on the program code in region of interest.

In one aspect, since system calls may occur in region of interest (e.g., file input/output "I/O"), the present invention provides for treating/tracing system calls. It should be noted that it is infeasible to trace a system state without kernel modifications and unable to extract. Also, system calls may have side effects (i.e., change state) and cannot be replaced by no operations ("NOPs" or "NOOP"). Thus, the present invention may track system calls using the ptrace interface, differentiate between user code and support library origin by 1) using an architecture-dependent solution such as, for example, by using a program counter ("PC")/Link register and memory region layout, and/or 2) an architecture-independent solution by inserting signals at entry/exit points of support routines to mark code pertaining to the preloaded support library. Also, the present invention may split trace when system call occurs by stopping a current trace and restarting the current trace immediately after system call returns.

The present invention also provides for treating stack and anonymous regions. In order to be able to trace a stack, the present invention provides for injected routines (e.g., tracer_begin and tracer_end), as well as the registered signal handler to run under its own stack otherwise the tracing protocol may break due to detecting a stack access (i.e., receiving a segmentation fault, while handling a different segmentation fault).

In regards to the injected routines, during the tracing process, calls may be inserted to support routines, which access memory and modify page permissions from inside the execution context of the traced child process. These routines are injected by preloading a library with these function and setting the PC to their address when the parent process returns execution control to the child process (similar to a forced jump instruction). In order to prevent such problems, all support library functions use an alternative stack. It should be noted that in the case of the injected routines (e.g., tracer_begin and tracer_end), a stack pointer manipulation is created.

For tracing of anonymous memory regions, certain memory allocations, as well as memory mapped pages, are allocated in anonymous regions (which may be the case for both user code as well as pages used by the support library itself). In order to differentiate between the two anonymous regions (and the present invention does not want to protect memory used by the support library), the present invention may track calls to mmap/munmap and classify which pages can be attributed to the preloaded support library and marked as unable to protect, all of which is due to implementation details. The support library, and the libraries the support library is using, may allocate dynamic memory using mmap. If the calls are protected, a faulty behavior may result (similar to the issue mentioned above, i.e., shared code pages). In order to circumvent this issue, the present invention may track which memory regions are mapped to a support library, and by extensions, which memory regions are not mapped to the support library, and therefore safe to protect. This is achieved by recording mmap/munmap system calls while the support library is loaded, and keeping a list of mapped pages of the support library.

Furthermore, for a post-process pass, the present invention may identify redundant traces such as, for example, the same pages/same page data and/or same runtime behavior (e.g., instructions per cycle "IPC"). The present invention may also produce a standalone executable such as, for example, by using a simulator that may load code pages and allocate data pages at the same locations as during the traced execution, and also using a machine (e.g., actual/real computing machine) and generate a custom linker script that replicates the same memory layout.

Figure 7:
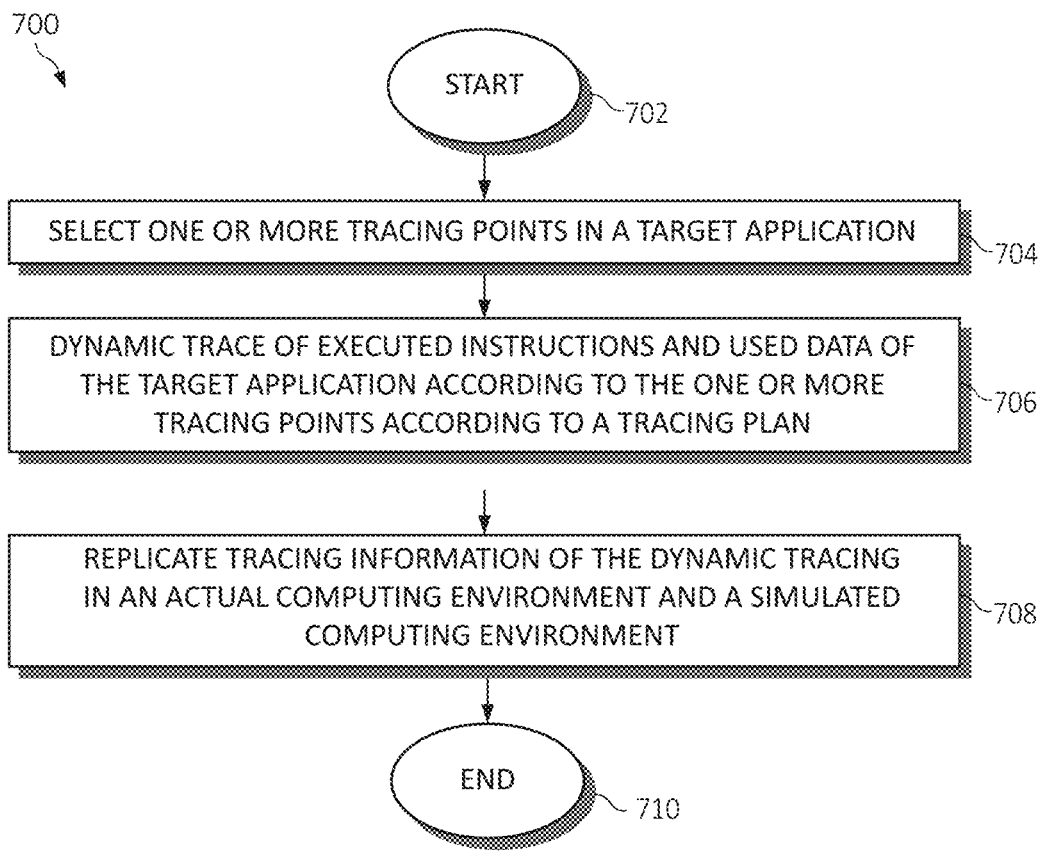
FIG. 7 is a flowchart diagram depicting an additional exemplary method for generating representative microbenchmarks by tracing code and data pages in a computing environment in which aspects of the present invention may be realized.

Turning now to FIG. 7, a method 700 for generating representative microbenchmarks by tracing code and data pages in a computing environment is depicted, in which various aspects of the illustrated embodiments may be implemented. That is, FIG. 7 is a flowchart of an additional example method 700 for using a memory access broker system with application-controlled early write acknowledgment support in a computing environment according to an example of the present invention. The functionality 700 may be implemented as a method executed as instructions on a machine, where the instructions are included on at least one computer readable storage medium or one non-transitory machine-readable storage medium. The functionality 700 may start in block 702.

One or more tracing points may be selected in a target application, as in block 704. Executed instructions and used data of the target application may be dynamically traced according to the one or more tracing points according to a tracing plan, as in block 706. Tracing information of the dynamic tracing may be replicated in an actual computing environment and a simulated computing environment, as in block 708. The functionality 700 may end in block 710.

In one aspect, in conjunction with and/or as part of at least one block of FIG. 7, the operation of 700 may include one or more of each of the following. The operation of 700 may select the one or more tracing points according to a profiling pass, temporal sampling, or a combination thereof.

The operation of 700 may define the tracing plan to include using dynamic instrumentation to protect one or more memory regions and detect code execution and data accesses at a page granularity.

The operation of 700 may execute the tracing plan for the dynamic tracing by defining the one or more tracing points, extracting one or more accessed pages by dynamically instrumenting the target application, using a process trace interface to control a pace of the dynamic tracing, and/or protecting a selected memory within a defined region of interest in the target application.

The operation of 700 may define the tracing plan to include a profiler and a traced process and define the tracing plan to include a preamble state, region of interest, and an epilogue. The operation of 700 may perform a post processing to replicate the tracing information, and/or analyze collected trace information and eliminate redundancy of the collected trace information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, executed by a processor, for generating representative microbenchmarks in a computing environment, comprising:
   selecting one or more tracing points in a target application;
   dynamically tracing executed instructions and used data of the target application according to the one or more tracing points according to a tracing plan, wherein only a portion of code of the target application comprising the dynamically traced executed instructions of a selected callable function of the target application is collected according to a beginning address and an end address in memory of the selected callable function;
   defining the tracing plan to include a profiler stack comprising a parent process and a traced process stack comprising a child process of the parent process, wherein the parent process executes a fork system call to generate the child process as a copy of the parent process, and wherein the tracing of the executed instructions and used data is performed within the child process according to trap instructions inserted in the profiler stack and the traced process stack; and
   replicating tracing information of the dynamic tracing by generating a linker script replicating a layout of data pages in the memory, inclusive of the beginning address and the end address of the selected callable function, used during the tracing in an actual computing environment and utilizing a simulator to load code pages and allocate the data pages at identical memory locations used during the tracing in a simulated computing environment such that only the portion of code of the target application is simulated in the simulator without modifying, recompiling, nor rebuilding the code of the target application during the trace.

2. The method of claim 1, further including selecting the one or more tracing points according to a profiling pass, temporal sampling, or a combination thereof.

3. The method of claim 1, further including defining the tracing plan to include using dynamic instrumentation to protect one or more memory regions and detect code execution and data accesses at a page granularity.

4. The method of claim 1, further including executing the tracing plan for the dynamic tracing by:
   defining the one or more tracing points; and
   extracting one or more accessed pages by dynamically instrumenting the target application.

5. The method of claim 4, further including executing the tracing plan for the dynamic tracing by:
   using a process trace interface to control a pace of the dynamic tracing; and protecting a selected memory within a defined region of interest in the target application.

6. The method of claim 1, further including defining the tracing plan to include a preamble state, region of interest, and an epilogue.

7. The method of claim 1, further including:
performing a post processing to replicate the tracing information; and
analyzing collected trace information and eliminating redundancy of the collected trace information.

8. A system for generating representative microbenchmarks in a computing environment, comprising:
one or more computers with executable instructions that when executed cause the system to:
select one or more tracing points in a target application;
dynamically trace executed instructions and used data of the target application according to the one or more tracing points according to a tracing plan, wherein only a portion of code of the target application comprising the dynamically traced executed instructions of a selected callable function of the target application is collected according to a beginning address and an end address in memory of the selected callable function;
define the tracing plan to include a profiler stack comprising a parent process and a traced process stack comprising a child process of the parent process, wherein the parent process executes a fork system call to generate the child process as a copy of the parent process, and wherein the tracing of the executed instructions and used data is performed within the child process according to trap instructions inserted in the profiler stack and the traced process stack; and
replicate tracing information of the dynamic tracing by generating a linkerscript replicating a layout of data pages in the memory, inclusive of the beginning address and the end address of the selected callable function, used during the tracing in an actual computing environment and utilizing a simulator to load code pages and allocate the data pages at identical memory locations used during the tracing in a simulated computing environment such that only the portion of code of the target application is simulated in the simulator without modifying, recompiling, nor rebuilding the code of the target application during the trace.

9. The system of claim 8, wherein the executable instructions select the one or more tracing points according to a profiling pass, temporal sampling, or a combination thereof.

10. The system of claim 8, wherein the executable instructions define the tracing plan to include using dynamic instrumentation to protect one or more memory regions and detect code execution and data accesses at a page granularity.

11. The system of claim 8, wherein the executable instructions execute the tracing plan for the dynamic tracing by:
defining the one or more tracing points; and
extracting one or more accessed pages by dynamically instrumenting the target application.

12. The system of claim 11, wherein the executable instructions execute the tracing plan for the dynamic tracing by:
using a process trace interface to control a pace of the dynamic tracing; and
protecting a selected memory within a defined region of interest in the target application.

13. The system of claim 8, wherein the executable instructions define the tracing plan to include a preamble state, region of interest, and an epilogue.

14. The system of claim 8, wherein the executable instructions:
perform a post processing to replicate the tracing information; and
analyze collected trace information and eliminate redundancy of the collected trace information.

15. A computer program product for, by a processor, generating representative microbenchmarks in a computing environment, the computer program product comprising a non-transitory computer-readable storage medium having computer-readable program code portions stored therein, the computer-readable program code portions comprising:
an executable portion that selects one or more tracing points in a target application;
an executable portion that dynamically traces executed instructions and used data of the target application according to the one or more tracing points according to a tracing plan, wherein only a portion of code of the target application comprising the dynamically traced executed instructions of a selected callable function of the target application is collected according to a beginning address and an end address in memory of the selected callable function;
an executable portion that defines the tracing plan to include a profiler stack comprising a parent process and a traced process stack comprising a child process of the parent process, wherein the parent process executes a fork system call to generate the child process as a copy of the parent process, and wherein the tracing of the executed instructions and used data is performed within the child process according to trap instructions inserted in the profiler stack and the traced process stack; and
an executable portion that replicates tracing information of the dynamic tracing by generating a linker script replicating a layout of data pages in the memory, inclusive of the beginning address and the end address of the selected callable function, used during the tracing in an actual computing environment and utilizing a simulator to load code pages and allocate the data pages at identical memory locations used during the tracing in a simulated computing environment such that only the portion of code of the target application is simulated in the simulator without modifying, recompiling, nor rebuilding the code of the target application during the trace.

16. The computer program product of claim 15, further including an executable portion that selects the one or more tracing points according to a profiling pass, temporal sampling, or a combination thereof.

17. The computer program product of claim 15, further including an executable portion that defines the tracing plan to include using dynamic instrumentation to protect one or more memory regions and detect code execution and data accesses at a page granularity.

18. The computer program product of claim 15, further including an executable portion that executes the tracing plan for the dynamic tracing by:
defining the one or more tracing points; and
extracting one or more accessed pages by dynamically instrumenting the target application;
using a process trace interface to control a pace of the dynamic tracing; and protecting a selected memory within a defined region of interest in the target application.

19. The computer program product of claim 15, further including an executable portion that
defines the tracing plan to include a preamble state, region of interest, and an epilogue.

20. The computer program product of claim 15, further including an executable portion that:
performs a post processing to replicate the tracing information; and
analyzes collected trace information and eliminates redundancy of the collected trace information.

\* \* \* \* \*